United States Patent [19]

Dickerhof et al.

[11] Patent Number: 4,942,198
[45] Date of Patent: Jul. 17, 1990

[54] AQUEOUS PIGMENTED TWO-COMPONENT LACQUERS FOR SINGLE-LAYERED COATING OF FINISH FILMS AND CONTINUOUS EDGES

[75] Inventors: Karl-heinz Dickerhof, Drensteinfurt; Gunther Schwarz, Munster, both of Fed. Rep. of Germany

[73] Assignee: Basf Lacke & Farben Aktiengesellschaft, Munster, Fed. Rep. of Germany

[21] Appl. No.: 275,083
[22] PCT Filed: Mar. 13, 1987
[86] PCT No.: PCT/EP87/00148
§ 371 Date: Sep. 27, 1989
§ 102(e) Date: Sep. 27, 1989
[87] PCT Pub. No.: WO87/05921
PCT Pub. Date: Oct. 8, 1987

[30] Foreign Application Priority Data

Mar. 29, 1986 [DE] Fed. Rep. of Germany ....... 3610764

[51] Int. Cl.$^5$ .............................................. C08L 61/04
[52] U.S. Cl. .................................... 524/510; 524/512; 525/155
[58] Field of Search ....................... 524/510, 511, 512; 525/154, 155, 398

[56] References Cited

U.S. PATENT DOCUMENTS 4,303,581 12/1981 Levine et al. .

FOREIGN PATENT DOCUMENTS 1178903 4/1967 United Kingdom .

Primary Examiner—Joseph L. Schofer
Assistant Examiner—Jeffrey T. Smith
Attorney, Agent, or Firm—Kenyon & Kenyon

[57] ABSTRACT

The invention relates to aqueous two-component lacquers containing pigments and other customary additives for single-layered coating of finish film and continuous edges. The two-component lacquers according to the invention are such lacquers in which the first component (component (A)) contains 0.1 to 15% by weight, preferably 2 to 10% by weight, based on the total weight of component (A), of a blocked acid as a potential hardening catalyst and 10 to 90% by weight, preferably 20 to 65% by weight, based on the total weight of component (A), of an aqueous dispersion of a self-crosslinking polyacrylate, in which the polyacrylate contains, as the groups which facilitate self-crosslinking, acid amide derivative groups which correspond to the general structural formula $-CO-N(R^1)-CH(R^2)-OR^3$, in which $R^1$=an H atom or a $-CH(R^2)-OR^3$ grouping, $R^2$=an H atom or a $-COOR^4$ group, $R^3$=an H atom or a hydrocarbon radical containing 1 to 10 C atoms, preferably a methyl, ethyl, (iso)propyl or (iso)butyl radical, and $R^4$=an alkyl radical with 1 to 5 C atoms, and the second component (component (B)) contains 20 to 90% by weight, preferably 70 to 90% by weight, based on the total weight of component (B), of a melamine resin dispersed or dissolved in an aqueous medium or of a melamine/urea resin mixture dispersed or dissolved in an aqueous medium, and components (A) and (B) are mixed before application in a ratio such that 0.4 to 1.0, preferably 0.6 to 0.8 part by weight of melamine resin or 0.4 to 1.5, preferably 1.0 to 1.2 parts by weight of melamine/urea resin mixture are present per part by weight of self-crosslinking polyacrylate resin.

18 Claims, No Drawings

AQUEOUS PIGMENTED TWO-COMPONENT LACQUERS FOR SINGLE-LAYERED COATING OF FINISH FILMS AND CONTINUOUS EDGES

The invention relates to aqueous two-component lacquers containing pigments and other customary additives for single-layered coating of finish films and continuous edges.

Impregnated papers which, when pressed onto sheets, represent preparation in the context of priming (primer film) or frequently also have a decorative effect (decorative film) proved themselves a long time ago in the furniture and sheet materials industry. The shortage and increase in the price of true veneers has contributed quite considerably to an increased use of the latter type of films. After pressing onto chipboard or hardboard, the films must be after-lacquered, since otherwise the surface effect is inadequate.

In the course of simplification of the production process, an improved type of impregnated paper, the finish film, has been making more and more of a breakthrough. This is impregnated monochrome or printed paper films already provided with a coat of lacquer at the film manufacturer's after the impregnation.

The finish films and continuous edges (for continuous edge coating) thus obtained are supplied as roll goods to the furniture and sheet materials industry, where they are glued to substrates, such as, for example, chipboard or hardboard, under the action of pressure and heat. Surfaces which as a rule do not require further lacquering, that is to say can be further processed "from the press" are obtained in this way.

The finish films or continuous edges in question can be lacquered either with a pigmented lacquer or with a clear lacquer.

In both cases, the lacquers and the coatings produced from the lacquers must meet high requirements.

Thus, only small amounts of organic solvents and/or formaldehyde, if any, should be emitted both during coating of finish films and continuous edges and during further processing of the coated films and edges.

It is also desirable for the lacquered but not yet pressed films not to curve or even roll up.

It is particularly important for the lacquers used for coating the finish films and continuous edges to be hardened after heat treatment at 140° to 210° C. lasting less than 60 seconds, as a rule 10 to 20 seconds, to the extent that, under the pressing conditions applied during production of sheets or items of furniture (for example 5 to 30 seconds at 150° to 180° C. and 5 to 20 kp/cm$^2$; intensified pressing conditions: up to 180 seconds at 170°–180° C. and up to 30 kp/cm$^2$), they survive without damage and without displaying blocking effects or discoloration. The surfaces thus obtained should have the minimum possible metal abrasion and the maximum possible scratch resistance, and as far as possible should achieve the resistance values required in DIN standard 68861 group A. The following requirements are imposed on the surfaces to be tested in group A of DIN 68861:

| Test agent | A At | Res |
|---|---|---|
| 1 Acetic acid | 16* | 0 |
| 2 Citric acid | 16* | 0 |
| 3 Sodium carbonate | 16* | 0 |
| 4 Aqueous ammonia | 16* | 0 |
| 5 Ethyl alcohol | 16* | 0 |
| 6 White wine, red wine, fortified wine | 16* | 0 |
| 7 Beer | 16* | 0 |
| 8 Cola drinks | 16* | 0 |
| 9 Instant coffee | 16* | 0 |
| 10 Black tea | 16* | 0 |
| 11 Blackcurrant juice | 16* | 0 |
| 12 Condensed milk | 16* | 0 |
| 13 Water | 16* | 0 |
| 14 Petrol | 16* | 0 |
| 15 Acetone | 16* | 0 |
| 16 Ethyl/butyl acetate | 16* | 0 |
| 17 Butter | 16* | 0 |
| 18 Olive oil | 16* | 0 |
| 19 Mustard | 16* | 0 |
| 20 Sodium chloride | 16* | 0 |
| 21 Onion | 16* | 0 |
| 22 Lipstick | 16* | 0 |
| 23 Disinfectant | 16* | 0 |
| 24 Black ballpoint pen ink | 16* | 0 |
| 25 Stamp dye | 16* | 0 |
| 26 Cleaning agents | 16* | 0 |
| 27 Cleaning solution | 16* | 0 |

At = Action time of the test agent
Res = Result

Description of the results

The result of testing shall be stated in accordance with the following rating scale by comparing the tested and non-tested surface:

0 No visible changes
1 Just detectable changes in gloss or color
2 Slight changes in gloss or color; the structure of the test surface is not changed
3 Severe markings visible; the structure of the test surface, however, is largely undamaged
4 Severe markings visible; the structure of the test surface is changed
5 Test surface severely changed or destroyed There is a great demand for pigmented film top lacquers with a high covering power.

The abovementioned requirements for a low solvent emission can be met only by aqueous lacquer systems.

Surfaces which have a high scratch resistance and the minimal possible metal abrasion and which as far as possible achieve the resistance values required in DIN standard 68861 group A are very much more difficult to realize with pigmented systems than with non-pigmented systems.

Thus, for example, the surface properties—in particular the metal abrasion properties—of coatings which have been produced, for example, from water-dilutable lacquers containing acid-hardening melamine and/or urea resins as binders become poorer and poorer as the pigment content increases, that is to say as the covering power increases. Coatings of this type which have a high covering power therefore only have good surface properties if they have been covered with a protecting clear lacquer. However, the application of a second protecting layer of clear lacquer has the disadvantages that an additional operation is necessary to produce the finish films or continuous edges, and that the film manufacturer must pay the price of holding a much greater and therefore more expensive stock of lacquer in comparison with the single-layer process.

Lacquers based on acid-hardening melamine and/or urea resins furthermore have the disadvantage that they emit a relatively large amount of formaldehyde during processing and thereafter.

The invention is based on the object of providing novel aqueous pigmented lacquers for single-layered coating of finish films and continuous edges.

The novel lacquers should have, above all, a high covering power and should be hardened after heat treatment at 140° to 210° C. lasting for less than 60 seconds, as a rule 10 to 20 seconds, to the extent that they survive the pressing conditions used in the production of sheets or items of furniture—especially the intensified pressing conditions being increasingly used—undamaged, without showing blocking effects and discoloration. The surfaces thus obtained should have the minimum possible metal abrasion and a maximum possible scratch resistance, and should as far as possible achieve the resistance values required in DIN standard 68861 group A.

The novel lacquers should furthermore emit as little formaldehyde as possible both during coating of the films and continuous edges and during further processing of the coated films and continuous edges.

Finally, after application, the novel lacquers should not cause curving or even rolling up of the films.

"Thermosetting acrylic emulsions" (Talak, Pontis, Paint & Resin 1983, Volume 53, No. 6, 34 et seq.) (1) describes non-pigmented coating compositions which essentially consist of aqueous emulsions of polyacrylates containing carboxyl, hydroxyl and methylolamide groups, hexamethoxymethylmelamine, the ammonium salt of p-toluenesulfonic acid as a blocked hardening catalyst and butylcellosolve.

The aqueous coating compositions disclosed in (1) are said to be suitable for a wide range of fields of application—including coating of paper inter alia.

However, no indication is to be found in (1) that the lacquer systems described there are suitable for the production of pigmented film top lacquers which have a high covering power and can be applied as a single layer.

Attempts to use the coating compositions described in (1) for the purpose described above in more detail led to only unsatisfactory results.

After pressing the films coated with the lacquers disclosed in (1), surfaces were obtained which gave very poor test results, above all when tested with red wine, instant coffee and black tea (compare also the comments on DIN 68861 group A).

The object on which the present invention is based was to be achieved, surprisingly, by providing lacquers in which the first component (component (A)) contains 0.1 to 15% by weight, preferably 2 to 10% by weight, based on the total weight of component (A), of a blocked acid as a potential hardening catalyst and 10 to 90% by weight, preferably 20 to 65% by weight, based on the total weight of component (A), of an aqueous dispersion of a self-crosslinking polyacrylate, in which the polyacrylate contains, as the groups which facilitate self-crosslinking, acid amide derivative groups which correspond to the general structural formula $-CO-N(R^1)-CH(R^2)-OR^3$, in which $R^1=$ an H atom or a $-CH(R^2)-OR^3$ grouping, $R^2=$ an H atom or a $-COOR^4$ group, $R^3=$ an H atom or a hydrocarbon radical containing 1 to 10 C atoms, preferably a methyl, ethyl, (iso)propyl or (iso)butyl radical, and $R^4=$ an alkyl radical with 1 to 5 C atoms, and the second component (component (B)) contains 20 to 90% by weight, preferably 70 to 90% by weight, based on the total weight of component (B), of a melamine resin dispersed or dissolved in an aqueous medium or of a melamine/urea resin mixture dispersed or dissolved in an aqueous medium, and the components (A) and (B) are mixed before application in a ratio such that 0.4 to 1.0, preferably 0.6 to 0.8 part by weight of melamine resin or 0.4 to 1.5, preferably 1.0 to 1.2 parts by weight of melamine/urea resin mixture are present per part by weight of self-cross-linking polyacrylate resin.

The lacquer systems according to the invention and advantageous embodiments of the lacquer systems according to the invention are illustrated in more detail below. An aqueous lacquer is to be understood as a lacquer in which the liquid diluent consists of water to the extent of at least 95% by weight, preferably 98 to 100% by weight, based on the sum of all the liquid diluents. In addition, the lacquer can also contain organic solvents, such as, for example, heterocyclic or aliphatic hydrocarbons, mono- or polyvalent alcohols, ethers, esters and ketones, such as, for example, N-methylpyrrolidone, butanol, ethyl- and butylglycol and acetates thereof, butyl diglycol, ethylene glycol dibutyl ether, ethylene glycol diethyl ether, diethylene glycol dimethyl ether, cyclohexanone, methyl ethyl ketone, acetone, isophorone and propylene glycol, or mixtures thereof.

The lacquer systems according to the invention are pigmented systems which preferably contain pigments in an amount such that they have a high covering power.

The pigments are preferably incorporated into component (A).

The pigment content differs greatly according to the covering power desired and according to the pigment, and can be between 0.1 and 50% by weight, preferably between 5 and 40% by weight and especially preferably between 7 and 30% by weight, based on the total weight of component (A).

The particular optimum pigment content can be ascertained by the average expert with the aid of routine investigations which are easy to carry out.

Pigments which can be used are all the inorganic and organic pigments which are both water-wettable and cannot be sublimed at the temperatures applied, and which do not change in color shade under the process and pH conditions (pH 2 to pH 10).

Examples of suitable pigments are titanium dioxide of the rutile type, yellow, red and black iron oxides, carbon black and phthalocyanines.

Titanium dioxide is preferably used as the pigment.

Examples which may be mentioned of customary additives which the components of the lacquers according to the invention can contain are, for example: fillers (barium sulfate, silicic acid derivatives . . . ), flow control and wetting agents (sodium salts of polyacrylates . . . ), emulsifiers (ethoxylated alkylphenols, ethoxylated fatty acids . . . ), foam suppressants, plasticizers (ethoxylated glycerol . . . ), matting agents and waxes.

The lacquers according to the invention are two-component systems consisting of component (A) and (B). When separate, the two components are storage-stable over a very long time.

Before application, the two components (A) and (B) are mixed to give a mixture, the pot life of which at room temperature depends on the ratio in which components (A) and (B) have been mixed. The procedure in the furniture and sheet materials industry requires that the pot lives of the mixtures consisting of components (A) and (B) are more than 24 hours.

Longer pot lives are achieved with (B) components containing melamine/urea resin mixtures as the binder than with (B) components containing pure melamine resins as the binder. The higher the urea resin content in (B) component, the longer the pot life and the lower the reactivity of the (B) component.

When melamine/urea resin mixtures are used, it should therefore be ensured that the reactivity of component (B) does not fall to the extent that the lacquer system no longer hardens sufficiently under the application conditions described above. The optimum urea resin content can be determined by the average expert by simple means.

Suitable melamine/urea resin mixtures contain one part by weight of urea resin and 1 to 10 parts by weight of melamine resin.

Good coating results and pot lives pot life (sic) at room temperature of up to 20 days) can be achieved if components (A) and (B) are mixed in a ratio such that 0.4 to 1.0, preferably 0.6 to 0.8 part by weight of melamine resin or 0.4 to 1.5, preferably 1.0 to 1.2 parts by weight of melamine/urea resin mixture are present per part by weight of self-crosslinking polyacrylate resin.

As soon as the mixture of components (A) and (B) has been applied and has been brought to a temperature of 140° to 210° C., it hardens within 10 to 55 seconds, as a rule within 10 to 20 seconds, to the extent that the resulting lacquer surfaces survive further process steps —in particular the intensified pressing conditions being used to an increasing degree—without displaying blocking effects or discoloration.

A particularly great advantage of the lacquer systems according to the invention is that they can be pigmented with an amount of pigments necessary for a high covering power, but nevertheless, even after application of intensified pressing conditions, still give surfaces with such good properties that application of a protecting clear lacquer is not necessary.

Thus, the surfaces produced with the lacquer systems according to the invention display metal abrasion properties and scratch resistance values which can otherwise be achieved only with systems applied in two layers (pigmented base lacquer, protecting clear lacquer). (The metal abrasion properties can easily be determined with the aid of the so-called "ring test". In this, the surface to be tested is scraped several times with a finger ring made, for example, of white gold. If a marking then remains visible and cannot be removed again by wiping gently with a cloth, the surface has poor metal abrasion properties.)

The coatings produced with the lacquers according to the invention furthermore meet virtually all the requirements imposed on the abovementioned group A of DIN standard 68861. It should be emphasized in particular that the surfaces produced with the lacquers according to the invention show only very little swelling behavior, if any, in the tests and that they have a particularly good resistance towards instant coffee.

The lacquers according to the invention furthermore have the advantage that the films coated with them do not curve or even roll up and that the lacquers emit only very small amounts of formaldehyde. In addition to the customary additives, component (A) contains 0.1 to 15% by weight, preferably 2 to 10% by weight, of a blocked acid and 10 to 90% by weight, preferably 20 to 65% by weight, of a self-crosslinking aqueous polyacrylate dispersion. The weight percentage data relate to the total weight of component (A). By a blocked acid there is to be understood an acid salt which dissociates into the free acid and base only at higher temperatures. The acid liberated then acts as a crosslinking or hardening catalyst. Salts of an acid and an amine are used according to the invention as blocked acids. The blocked acids are prepared by well-known processes by reactions of acids with amines, which are preferably carried out in water. Acids which can be used are all the organic or inorganic acids suitable for the present purpose, such as, for example, hydrochloric acid, phosphoric acid or p-toluenesulfonic acid, p-toluenesulfonic acid preferably being used.

Amines which can be used are ammonia, triethylamine, dimethyl- or diethylaminoethanol, 2-amino-2-methylpropanol, 2-dimethylamino-2-methylpropanol, 2-amino-2-ethylpropane-1,3-diol or 2-amino-2-hydroxymethylpropane-1,3-diol.

Especially good results are achieved if the acid salts have been prepared by reaction of a suitable acid with 2-amino-2-ethylpropane-1,3-diol and/or 2-amino-2-methylpropanol.

The self-crosslinking aqueous polyacrylate dispersion consists of an aqueous dispersion of a self-crosslinking polyacrylate resin which contains, as the groups which facilitate self-crosslinking, acid amide groups which correspond to the general structural formula $—CO—N(R^1)—CH(R^2)—O—R^3$, in which $R^1=$ an H atom or a $—CH(R^2)—OR^3$ grouping, $R^2=$ an H atom or a $—COOR^4$ group, $R^3=$ an H atom or a hydrocarbon radical which contains 1 to 10 C atoms, preferably a methyl, ethyl or (iso)butyl radical, and $R^4=$ an alkyl radical with 1 to 5 C atoms.

The $—CO—N(R^1)—CH(R^2)—O—R^3$ groups can have been introduced into the polyacrylate molecules either via a copolymerized monomer or via a polymer-analogous reaction.

The $CO—N(R^1)—CH(R^2)—O—R^3$ groups in which $R^1$ and $R^2$ denote hydrogen atoms and $R^3$ denotes a hydrogen atom or an alkyl radical with 1 to 4 C atoms, preferably methyl, ethyl, (iso)propyl or (iso)butyl, are preferred.

Coatings with particularly good surface properties are obtained if the self-crosslinking polyacrylate resins furthermore also contain carboxyl groups, in addition to the acid amide derivative groups described above.

However, the carboxyl group content of the self-crosslinking polyacrylate resin should not be so high that the polyacrylate dissolves at a pH of 2 to 10.

In most cases, it is sufficient for the carboxyl group content of the polyacrylate to be significantly below the value which would be necessary for dissolving the polyacrylate in the aqueous dispersing medium with a pH of 2 to 10.

The expert can determine what carboxyl group content he is to choose for his particular problem with the aid of a few orientating experiments.

The polyacrylate resin to be used according to the invention can furthermore also contain other functional groups, such as, for example, hydroxyl groups or free amide groups, in addition to the acid amide derivative groups and carboxyl groups.

The aqueous dispersions which can be used according to the invention can be prepared by generally known methods by copolymerization of (meth)acrylic acid esters, preferably methyl, ethyl, propyl or butyl (meth)acrylates, the corresponding (meth)acrylic acid amide derivatives and if appropriate the corresponding amount of monomers which carry carboxyl groups and contain a polymerizable double bond, for example fumaric or maleic acid, preferably (meth)acrylic acid, with the possible use also of small amounts of other monomers, such as, for example, vinyl acetate, hydroxyalkyl (meth)acrylates, (meth)-acrylic acid amides and the like.

Dispersions with the following characteristic data are preferably employed.

Solids: 40 to 60% by weight, preferably 50% by weight, based on the total weight of the aqueous polyacrylate dispersion.

Average particle diameter: 0.1 to 0.5 μm, preferably 0.2 to 0.3 μm.

Minimum film-forming temperature (MFT): 0° to 50° C., preferably between 20° and 35° C.

Viscosity: 200 to 5,000 mPas, preferably 200 to 1,000 mPas, and pH: 2-7, preferably 2-4.

Component (B) contains 20 to 90% by weight, preferably 70 to 90% by weight, based on the total weight of component (B), of a melamine resin dispersed or dissolved in an aqueous medium or a melamine/urea resin mixture dispersed or dissolved in an aqueous medium.

The water-dilutable melamine resins are generally known melamine-formaldehyde reaction products which as a rule are etherified.

The water-dilutability of the melamine resins depends, apart from on the degree of condensation, which should be as low as possible, on the etherification component, only the lowest members of the alkanol series giving water-soluble condensates. The hexamethoxymethylmelamine resins are of greatest importance. If solubilizing agents are used, butanol-etherified melamine resins can also be dispersed in the aqueous phase.

Examples which may be mentioned of the melamine resins which can be used according to the invention are the non-plasticized hexamethoxymethylmelamine resins commercially available under the tradenames Cymel 300, 301, 303, Luwipal 068, 066, Beetle BE 3745 or Maprenal MF 900, 910.

The urea resins are generally known water-dilutable urea-formaldehyde reaction products.

Examples which may be mentioned of urea resins which can be used according to the invention are the plasticized or non-plasticized urea-formaldehyde reaction products commercially available under the tradenames Dynomin UM 15, Resamin VHW 3525 or Plastopal . . . .

The invention also relates to a process for single-layered coating of finish films and continuous edges, in which the finish films or continuous edges are coated with a two-component lacquer consisting of components (A) and (B) and the wet film is then hardened at 140° to 210° C. for 10 to 55, preferably 10 to 20 seconds, which comprises using as the two-component lacquer a lacquer in which the first component (component (A)) contains 0.1 to 15% by weight, preferably 2 to 10% by weight, based on the total weight of component (A), of a blocked acid as a potential hardening catalyst and 10 to 90% by weight, preferably 20 to 65% by weight, based on the total weight of component (A), of an aqueous dispersion of a self-crosslinking polyacrylate resin, in which the polyacrylate contains, as the groups which facilitate self-crosslinking, acid amide derivative groups which correspond to the general structural formula —CO—N($R^1$)—CH($R^2$)—O$R^3$, in which $R^1$=an H atom or a —CH($R^2$)—O$R^3$ grouping, $R^2$=an H atom or a —COO$R^4$ group, $R^3$=an H atom or a hydrocarbon radical containing 1 to 10 C atoms, preferably a methyl, ethyl, (iso)propyl or (iso)butyl radical, and $R^4$=an alkyl radical with 1 to 5 C atoms, and in which the second component (component B)) contains 20 to 90% by weight, preferably 70 to 90% by weight, based on the total weight of component (B), of a melamine resin dispersed or dissolved in an aqueous medium or of a melamine/urea resin mixture dispersed or dissolved in an aqueous medium, and mixing its components, before application, in a ratio such that 0.4 to 1.0, preferably 0.6 to 0.8 part by weight of melamine resin or 0.4 to 1.5, preferably 1.0 to 1.2 parts by weight of melamine/urea resin mixture are present per part by weight of self-crosslinking polyacrylate resin.

The finish films and continuous edges are lacquered with machines developed specifically for this purpose. Screen rolls or wire doctors are available as lacquer application or metering devices. The amount of lacquer applied is usually between 5 and 60 g/m² at a wet film layer thickness of 10 to 80 μm. Drying tunnels with heated air, so-called convectors or IR radiators or combinations of the two systems are usually employed for drying the lacquer. After drying, the web of paper is wound up as a roll and is supplied in this form to the furniture industry.

The invention is illustrated in more detail in the following examples. All the data on parts and percentages are weight data, unless expressly indicated otherwise.

Examples of component (A) (all the amounts stated are based on 100 parts of component (A))

(A)-1

60 parts of a self-crosslinking acrylate dispersion with a solids content of 60% by weight, an average particle diameter of 0.3 μm, a pH of 2 to 3 and a viscosity of between 1,000 and 4,000 mPas and containing methylolamide groups are combined with 0.5 part of 2-amino-2-methylpropanol, 0.5 part of a foam suppressant containing mineral oil and phosphoric acid ester, 2.0 parts of a wetting agent based on ethoxylated fatty acids, 20 parts of titanium dioxide, 5 parts of barium sulfate and 1 part of aluminum silicate and the mixture is ground in a sand mill to a particle fineness of 10 to 15 μm. Thereafter, 5 parts of a plasticized urea resin, 1 part of a phthalic acid mixed ester and 5 parts of paratoluenesulfonic acid blocked with 2-amino-2-methylpropanol are added. The blocked hardener is prepared by neutralizing 20 g of paratuluenesulfonic (sic) acid with 10.6 g of 2-amino-2-methylpropanol in water.

(A)-2

55 parts of a self-crosslinking acrylate dispersion as described under (A)-1 are combined with 0.5 part of 2-amino-2-methylpropanol, 0.5 part of a foam suppressant containing mineral oil, 2.0 parts of a wetting agent based on ethoxylated alkylphenols, 30 parts of titanium dioxide, 5 parts of barium sulfate and 1 part of aluminum silicate and the mixture is ground by means of a sand mill to a particle fineness of 10 to 15 μm. Thereafter, 1 part of an ethoxylated glycerol derivative, 1 part of a polyethylene wax and 5 parts of a blocked hardener as described under A 1 are also added.

(A)3

Analogously to Example A 2, but only 25 parts of titanium dioxide and 5 parts of a pigment consisting of iron oxide red.

(A)4

50 parts of a self-crosslinking acrylate dispersion with a solids content of 50% by weight, an average particle diameter of 0.2 μm, a pH of 2 to 3 and a viscosity of less than 250 mPas and containing methylolamide groups are combined with 0.20 part of ammonia, 0.5 part of a foam suppressant containing mineral oil, 2.0 parts of a wetting agent based on ethoxylated fatty acids, 25 parts of titanium dioxide, 5 parts of barium sulfate and 1 part of aluminum silicate and the mixture is ground by means of a sand mill to a particle fineness of 10 to 15 μm. Thereafter, 5 parts of a polyethylene glycol ether (molecular weight 600), 1 part of a phthalic acid mixed ester, 3 parts of a plasticized urea resin, 2 parts of silicon dioxide as a matting agent, 0.3 part of a tetrafluoroethylene/ethylene copolymer wax and 5 parts of a hardener blocked as described under (A)-1 are added.

Examples of component (B) (all the amounts stated are based on 100 parts of component (B))

(B)-1

40 parts of a hexamethoxymethylmelamine resin are combined with 8 parts of butylglycol, 4 parts of water, 45 parts of a plasticized urea resin and 3 parts of a polyethylene-polypropylene wax mixture, with stirring.

(B)-2

10 parts of isopropanol and 10 parts of water are added to 80 parts of a hexamethoxymethylmelamine resin.

Components (A) and (B) are mixed, preferably in the ratio of 8:2, and the mixture is brought to a viscosity of about 20 seconds DIN 4/20° C. by dilution with tapwater. A lacquer mixture which is ready for processing is thus obtained.

Examples of lacquers prepared from components (A) and (B)

Components (A) and (B) are mixed and the mixture is brought to the processing viscosity and applied to a white preimpregnate (60 g/m²) The coating is then dried at 160° C. in a jet tunnel for 20 seconds and the coated paper is subsequently subjected to normal and intensified pressing conditions (45 seconds at 140° C. and 5 kp/cm² and 90 seconds at 175° C. and 25 kp/cm²). The weight of the dried and pressed lacquer layer is about 20 g/m² of paper surface.

TABLE 1

| (A)-4 (% by weight) | 90 | 80 | 70 |
|---|---|---|---|
| (B)-2 (% by weight) | 10 | 20 | 30 |
| Water added (% by weight) (based on 100% by weight of mixture of (A) + (B)) | 15 | 29 | 35 |
| Processing viscosity | all 20 seconds DIN 4 Mixing beaker | | |
| Pot life | >5 days | >1 day | Viscous after a few minutes, solid after 2 hours |
| Coffee test | 2 | 2 | — |
| Ring resistance | 0–1 | 0 | — |
| Scratch resistance | 2 | 1 | — |
| Covering power | 0 | 0 | — |
| Swelling (water) | 0 | 0 | — |

The rating scale corresponds to the rating scale of DIN 68861 group A.

TABLE 2

| Component (A) | A1 | A2 | A3 | A4 |
|---|---|---|---|---|
| Amount (% by weight) | 80 | 80 | 80 | 80 |
| Amount of (B)-1 (% by weight) | 20 | 20 | 20 | 20 |
| Water added (% by weight) (based on 100% by weight of mixture of (A) + (B)) | 13 | 12 | 14 | 15 |
| Processing viscosity | all 20 seconds DIN 4 mixing beaker | | | |
| Pot life | all >>3 days | | | |
| Coffee test | 0–1 | 1 | — | 2 |
| Ring resistance | 0 | 0–1 | 0 | 0–1 |
| Scratch resistance | 1 | 1 | 1 | 1 |
| Covering power | 0 | 0 | 0 | 0 |
| Swelling (water) | 0 | 0 | 0 | 0 |

The rating scale corresponds to the rating scale for DIN 68861 group A.

We claim:

1. An aqueous two-component lacquer for single-layered coating of finish films and continuous edges, in which the first component (component (A)) contains 0.1 to 15% by weight based on the total weight of component (A), of a blocked acid as a potential hardening catalyst and 10 to 90% by weight based on the total weight of component (A), of an aqueous dispersion of a self-crosslinking polyacrylate, in which the polyacrylate contains, as the groups which facilitate self crosslinking, acid amide derivative groups having the general structural formula —CO—N—($R^1$)—CH($R^2$)—$OR^3$, in which $R^1$ = an H atom or a —CH($R^2$)—$OR^3$ grouping,
$R^2$ = an H atom or a —$COOR^4$ group,
$R^3$ = an H atom or a hydrocarbon radical containing 1 to 10 C atoms, and
$R^4$ = an alkyl radical with 1 to 5 C atoms, and the second component (component (B)) contains 20 to 90% by weight based on the total weight of component (B), of a melamine resin dispersed or dissolved in an aqueous medium or of a melamine/urea resin mixture dispersed or dissolved in an aqueous medium, said components (A) and (B) being mixed before application in a ratio such that 0.4 to 1.0 part by weight of melamine resin or 0.4 to 1.5 parts by weight of melamine/urea resin mixture are present per part by weight of self-crosslinking polyacrylate resin.

2. A process for preparing a single-layered coating of finish films and continuous edges, in which the finish films or continuous edges are coated with an aqueous two-component lacquer comprising components (A) and (B) and the wet film is hardened at 140° to 210° C. for 10 to 55 seconds, which comprises:

using as the two-component lacquer a lacquer in which the first component (component (A)) contains 0.1 to 15% by weight based on the total weight of component (A), of a blocked acid as a potential hardening catalyst and 10 to 90% by weight based on the total weight of component (A), of an aqueous dispersion of a self-crosslinking polyacrylate resin, in which the polyacrylate contains, as the groups which facilitate self-crosslinking, acid amide derivative groups having the general structural formula —CO—N($R^1$)—CH($R^2$)—$OR^3$, in which $R^1$ = an H atom or a —CH($R^2$)—$OR^3$, grouping,
$R^2$ = an H atom or a —$COOR^4$ group,
$R^3$ = an H atom or a hydrocarbon radical containing 1 to 10 C atoms, and
$R^4$ = an alkyl radical with 1 to 5 C atoms, and the second component (component (B)) contains 20 to 90% by weight based on the total weight of component (B), of a melamine resin dispersed or dissolved in an aqueous medium, and mixing components (A) and (B) before application in a ratio such that 0.4 to 1.0 part by weight of melamine resin or 0.4 to 1.5 parts by weight of melamine/urea resin mixture are present per part by weight of self-crosslinking polyacrylate resin.

3. A lacquer or process as claimed in either of claims 1 or 2, wherein the potential hardening catalyst consists of a salt prepared from 2-amino-2-ethylpropane-1,3 diol or 2-amino-2-methylpropanol and an acid.

4. A lacquer or process as claimed in claims 1 or 2 wherein the acid amide groups which facilitate self-crosslinking of the polyacrylate have the general structural formula —CO—N($R^1$)—CH($R^2$)—$OR^{13}$, in which $R^3$ denotes a hydrogen atom or a hydrocarbon radical containing 1 to 10 C atoms.

5. A lacquer or process as claimed in claims 1 or 2 wherein the self-crosslinking polyacrylate furthermore also contains, in addition to the —CO—N($R^1$)—CH($R^2$)—$OR^3$ groups, carboxyl groups, wherein the carboxyl group content should be such that the polyacrylate does not dissolve at a pH of 2 to 10.

6. An aqueous two-component lacquer of claim 1 wherein component (A) contains a blocked acid as a potential hardening catalyst in an amount ranging from 2 to 10% by weight of component (A).

7. An aqueous two-component lacquer or claim 1 wherein component (A) contains an aqueous dispersion of a self-crosslinking polyacrylate in an amount ranging from 20 to 65% by weight, based on the weight of component (A).

8. An aqueous two-component lacquer of claim 1 wherein $R^3$ represents methyl, ethyl, isopropyl or isobutyl.

9. An aqueous two component lacquer of claim 1 wherein component (B) contains a melamine resin present in an amount ranging from 70 to 90% by weight of component (B).

10. A process of claim 2 wherein the wet film is hardened for 10 to 20 seconds.

11. A process of claim 2 wherein component (A) contains a blocked acid as a potential hardening catalyst present in an amount ranging from 2 to 10% by weight, based on the weight of component (A).

12. A process of claim 2 wherein component (A) contains an aqueous dispersion of a self-crosslinking polyacrylate resin present in an amount ranging from 20 to 65% by weight, based on the weight of component (A).

13. A process of claim 2 wherein $R^3$ is methyl, ethyl, isopropyl or isobutyl.

14. A process of claim 2 wherein component (B) contains a melamine resin present in an amount ranging from 70 to 90% by weight, based on the weight of component (B).

15. A process of claim 2 wherein components (A) and (B) are mixed in a ratio of 0.6 to 0.8 parts by weight of melamine resin per part by weight of self-crosslinking polyacrylate resin.

16. A process of claim 2 wherein components (A) and (B) are mixed in a ratio of 1.0 to 1.2 parts by weight of melamine/urea resin mixture per part by weight of self-crosslinking polyacrylate resin.

17. A lacquer or process of claim 3 wherein the acid is p-toluenesulfonic acid.

18. A lacquer or process of claim 4 wherein $R^3$ is methyl, ethyl, isopropyl or isobutyl.

* * * * *